(12) United States Patent
Nakahori et al.

(10) Patent No.: US 7,352,421 B2
(45) Date of Patent: Apr. 1, 2008

(54) LIQUID CRYSTAL DISPLAY APPARATUS AND MANUFACTURING METHOD THEREOF

(75) Inventors: Tadaki Nakahori, Kumamoto (JP); Nobuaki Ishiga, Kumamoto (JP); Kensuke Nagayama, Kumamoto (JP); Takuji Yoshida, Kumamoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 120 days.

(21) Appl. No.: 11/364,195

(22) Filed: Mar. 1, 2006

(65) Prior Publication Data

US 2006/0267120 A1 Nov. 30, 2006

(30) Foreign Application Priority Data

May 24, 2005 (JP) .............................. 2005-150491

(51) Int. Cl.
  *G02F 1/1335* (2006.01)
(52) U.S. Cl. ....................................................... 349/114
(58) Field of Classification Search ................ 349/114, 349/113
  See application file for complete search history.

(56) References Cited

U.S. PATENT DOCUMENTS

| | | | |
|---|---|---|---|
| 6,620,655 B2 * | 9/2003 | Ha et al. ...................... | 438/149 |
| 6,717,632 B2 * | 4/2004 | Ha et al. ........................ | 349/43 |
| 6,734,935 B2 * | 5/2004 | Kim et al. .................... | 349/114 |
| 6,885,420 B2 * | 4/2005 | Kim et al. .................... | 349/114 |
| 6,888,597 B2 * | 5/2005 | Ha et al. ...................... | 349/114 |
| 7,126,662 B2 * | 10/2006 | Choi et al. ................... | 349/155 |
| 7,184,113 B2 * | 2/2007 | Baek ............................ | 349/114 |
| 7,233,374 B2 * | 6/2007 | Ha et al. ...................... | 349/114 |
| 2004/0135945 A1 * | 7/2004 | Choi et al. ................... | 349/114 |
| 2005/0195347 A1 * | 9/2005 | Wen et al. .................... | 349/114 |

FOREIGN PATENT DOCUMENTS

| | | |
|---|---|---|
| JP | 11-281993 | 10/1999 |
| JP | 2003-248232 | 9/2003 |
| JP | 2003-255378 | 9/2003 |
| JP | 2004-46223 | 2/2004 |

OTHER PUBLICATIONS

U.S. Appl. No. 11/360,589, filed Feb. 24, 2006, Nakahori et al.
U.S. Appl. No. 11/364,195, filed Mar. 1, 2006, Nakahori et al.

\* cited by examiner

*Primary Examiner*—Toan Ton
(74) *Attorney, Agent, or Firm*—Oblon, Spivak, McClelland, Maier & Neustadt, P.C.

(57) ABSTRACT

A liquid crystal apparatus includes a TFT array substrate which includes gate wirings having a gate electrode, source wirings having a source electrode, a thin film transistor having the gate electrode, a semiconductor layer, the source electrode, and a drain electrode, an interlayer insulating film provided above the thin film transistor and the gate and source wirings, a transparent pixel electrode having a first transparent conductive film connected to the drain electrode through a contact hole, and put into contact with a surface of a insulating substrate through a pixel opening provided in a gate insulating film and the interlayer insulating film, a reflective pixel electrode made of an Al-alloy connected to the drain electrode, and a second transparent conductive film formed on the reflective electrode. The second transparent conductive film has a same pattern shape as the reflective pixel electrode and a thickness thereof is at least 5 nm.

4 Claims, 3 Drawing Sheets

LIQUID CRYSTAL DISPLAY APPARATUS AND MANUFACTURING METHOD THEREOF

BACKGROUND OF THE INVENTION

1. Field of the Invention

The present invention relates to an active matrix type liquid crystal display apparatus (TFT-LCD) using a thin film transistor (TFT) as a switching element and to a manufacturing method therefor and, more particularly, to a method of manufacturing a TFT array substrate, which has a transparent conductive film provided on a reflective pixel electrode, at low cost.

2. Description of the Related Art

The active matrix type liquid crystal display apparatus is configured so that a liquid crystal material is placed between a TFT array substrate, in which thin film transistors are arranged in a matrix manner on a glass substrate, and a color filter substrate having counter electrodes, and that the orientation of the liquid crystal material is controlled by the electrodes formed on the substrates to thereby display an image. The active matrix type liquid crystal display apparatuses have widely been developed as display apparatuses for laptop personal computers and OA monitors.

Ordinary related liquid crystal display apparatuses include a transmissive type liquid crystal display apparatus, which is adapted to display an image by installing a light source on a back surface or a side surface thereof, and a reflective type liquid crystal display apparatus adapted to display an image by installing a reflecting layer therein and by reflecting ambient light on the surface of the reflecting layer. The transmissive type liquid crystal display apparatus has a problem that in a case where ambient light is very bright, a display indicated by displaying-light cannot be observed because the displaying light is dark in comparison with the displaying-light. Also, the reflective type liquid crystal display apparatus has a problem that visibility is extremely degraded in a case where ambient light is dark. Thus, a liquid crystal display apparatus (hereunder referred to as a semi-transmissive type liquid crystal display apparatus), which has a transmissive pixel electrode and a reflective pixel electrode at each single pixel part, has attracted attention.

The structure of a related semi-transmissive type liquid crystal display apparatus is briefly described below.

A thin film transistor formed on a transparent insulating substrate has agate wiring including a gate electrode, a source wiring including a source electrode, a drain electrode formed in the same layer as that in which the source wiring is formed, and a channel that is provided between the source electrode and the drain electrode and that is constituted by a semiconductor film. Additionally, a passivation film and an organic film, which has an uneven surface, are formed therein to cover the thin film transistor. A transmissive pixel electrode, which is constituted by a transparent conductive film such as an ITO film, and a reflective pixel electrode constituted by a film made of a material (a high reflectance material) having a high optical reflectance are disposed on the organic film. These electrodes are connected to the drain electrode through tapered contact holes provided in the passivation film and the organic film. Additionally, such a TFT array substrate can be manufactured by performing six steps of a photolithography process (see, for example, JP-A-2003-248232 (pages 9 to 10, FIG. 3)).

In the TFT of the related semi-transmissive liquid crystal display apparatus, the corrosion of a transparent pixel electrode constituted by a transparent conductive film is caused by a cell reaction. The technique of forming a high melting-point metal film, such as an Mo film, just under the reflective pixel electrode is known as a countermeasure thereagainst (see, for instance, JP-A-11-281993 (FIG. 4)).

Further, in a case where an Al-alloy is used as the material of a reflective pixel electrode in a semi-transmissive liquid crystal display apparatus, as described above, a defective indication, such as a flicker, occurs due to a difference in a work function between the material of the reflective pixel electrode and that, such as ITO, of the transparent conductive film used as that of the color filter substrate serving as the counter substrate. The technique of forming a transparent conductive film on the reflective pixel electrode is known as a countermeasure thereagainst (see, for example, JP-A-2003-255378 (pages 4 to 7, FIG. 2)).

Also, the technique of turning the reflective pixel electrode and the transmissive pixel electrode upside down in the stacked layers is known as a countermeasure against the flicker and as the solution of the defective indication due to cell corrosion (see, for instance, JP-A-2004-46223 (FIGS. 10 and 31)).

A material including Al, which excels in reflectance and in an etching shape, as a principal ingredient is suited to the high-reflectance material of the reflective pixel electrode. However, the following problem occurs in the semi-transmissive liquid crystal display apparatus. That is, although the photolithography process for performing the patterning of the reflective pixel electrode usually has a step of immersing the electrode in developer, the pixel electrodes are corroded by a cell reaction between the alkaline developer and a transmissive pixel electrode, which serves as a foundation and is a transparent conductive film, such as an ITO, at that time.

The technique of forming a high-melting-point metal film, such as a Mo-film, which is described in JP-A-11-281993, is taken as a countermeasure against the cell reaction. This is because electrolyte, such as developer, is prevented by using a Mo-alloy film as a protective metal film from simultaneously being in contact with the Al material of the reflective pixel electrode and the ITO. Thus, occurrence of electrolytic corrosion between the Al material and the ITO can be prevented. In a case where the coverage of the Mo-alley on a pattern edge of the pixel electrode is poor and a crack or the like is present, the simultaneous contact of the developer with both of the ITO and the Al-material may occur due to the crack in the Mo-alloy. Therefore, this technique has problems that the corrosion-resistance of the electrode is not necessarily sufficient, and that there is the necessity for increasing the number of steps of forming films to form the Mo-alley film as the foundation thereby to increase the manufacturing cost of the display device.

Also, in a case where an Al-alloy is used as the material of the reflective pixel electrode in the semi-transmissive type liquid crystal display apparatus, a defective indication, such as a flicker, occurs due to the difference between the Al-alloy and the material of the transparent conductive film, such as ITO, used as the counter electrode on the color filter substrate serving as the counter substrate. Thus, the technique of forming the transparent conductive film on the reflective pixel electrode, as described in JP-A-2003-255378, is known as a countermeasure thereagainst. However, even in this configuration, the reflective pixel electrode and the source electrode are constituted by similar materials, such as Al. Thus, when etching is performed on the reflective pixel electrode, the source electrode is eroded by etchant for the reflective pixel electrode, so that disconnection of the source electrode may occur. Consequently, it is necessary to provide connecting metal layers in the contact hole parts provided in the organic film. Accordingly, this technique has problems that a new mask pattern is needed, that the number of steps increases, and that the manufacturing cost of the display apparatus increases.

Also, the technique of turning the reflective pixel electrode and the transmissive pixel electrode upside down in the stacked layers, as described in JP-A-2004-46223, is known as the countermeasure against the flicker and as the solution of the defective indication due to the cell corrosion. However, in such a configuration, usually, it is necessary for ensuring the coverage of the contact hole part that the thickness of the transparent conductive film, such as an ITO film, is about 50 nm or more. Thus, this technique has a problem that the reflectance of the reflective pixel electrode is degraded.

The invention is accomplished to solve the aforementioned problems. Accordingly, an object of the invention is to provide a manufacturing method enabled to manufacture a liquid crystal display apparatus, which excels in reflectance and prevents occurrences of a flicker and of cell corrosion, without increasing the number of manufacturing steps, thereby to obtain a high-quality low-cost liquid crystal display apparatus.

SUMMARY OF THE INVENTION

According to an aspect of the invention, a liquid crystal apparatus includes a TFT array substrate having an insulating substrate, a counter electrode substrate having a transparent common electrode, and a liquid crystal material sandwiched between the TFT array substrate and the counter electrode substrate. The TFT array substrate includes on the insulating substrate a plurality of gate wirings having a gate electrode, a plurality of source wirings having a source electrode and intersecting with the gate wirings, a thin film transistor having the gate electrode, a semiconductor layer provided on the gate electrode through a gate insulating film, the source electrode, and a drain electrode, an interlayer insulating film provided above the thin film transistor, the gate wirings, and the source wirings, a transparent pixel electrode having a first transparent conductive film, which is provided on the interlayer insulating film, is electrically connected to the drain electrode through a contact hole provided in the interlayer insulating film disposed above the drain electrode, and is put into contact with a surface of the insulating substrate through a pixel opening provided in the gate insulating film and the interlayer insulating film, a reflective pixel electrode made of an Al-alloy, which is electrically connected to the drain electrode in the contact hole through the first transparent conductive film, and a second transparent conductive film formed on the reflective electrode. The transparent pixel electrode and the reflective pixel electrode are provided in each single pixel part. The second transparent conductive film has a same pattern shape as that of the reflective pixel electrode and has a thickness that is at least 5 nm.

An embodiment of this liquid crystal apparatus features that the thickness of the second transparent conductive film is equal to or more than 5 nm or is equal to or less than 15 nm. An embodiment of this liquid crystal apparatus features that the thickness of each of the reflective pixel electrodes is equal to or more than 50 nm or is equal to or less than 200 nm.

According to the liquid crystal display apparatus of the invention and the manufacturing method thereof, the patterning of the second transparent conductive film is performed on the third metal film by using the same mask pattern as that used to perform the patterning of the reflective pixel electrode. Thus, the reflective pixel electrode and the second transparent conductive film having the same pattern shape as that of the reflective pixel electrode are formed. Consequently, a liquid crystal display apparatus, which can suppress the cell reaction between the reflective layer and the pixel electrode made of ITO and excels in reflectance, with high yield at low cost without increasing the number of manufacturing steps.

Also, according to the liquid crystal display apparatus of the invention and the manufacturing method thereof, the difference in work function between the reflective pixel electrode and the transparent common electrode of the counter electrode substrate can be reduced by forming the second transparent conductive film on the reflective pixel electrode. Also, the flicker and the burn-in of the liquid crystal can be reduced. Further, a liquid crystal display apparatus, which excels in quality, can be obtained at low cost with high yield.

Also, because the thickness of the second transparent conductive film is equal to or more than 5 nm, the reflecting layer made of Al or Al-alloy can be completely covered with the second transparent conductive film. Thus, the invention has advantages that in the photolithography process, the developer can be prevented from entering the boundary layer between the pixel electrode and the lower reflecting layer, and that the cell reaction can be suppressed. Further, because the thickness of the second transparent conductive film is equal to or less than 15 nm, the invention has an advantage that reduction in the reflectance can be suppressed.

DETAILED DESCRIPTION OF THE INVENTION

First Embodiment

Figure 1:
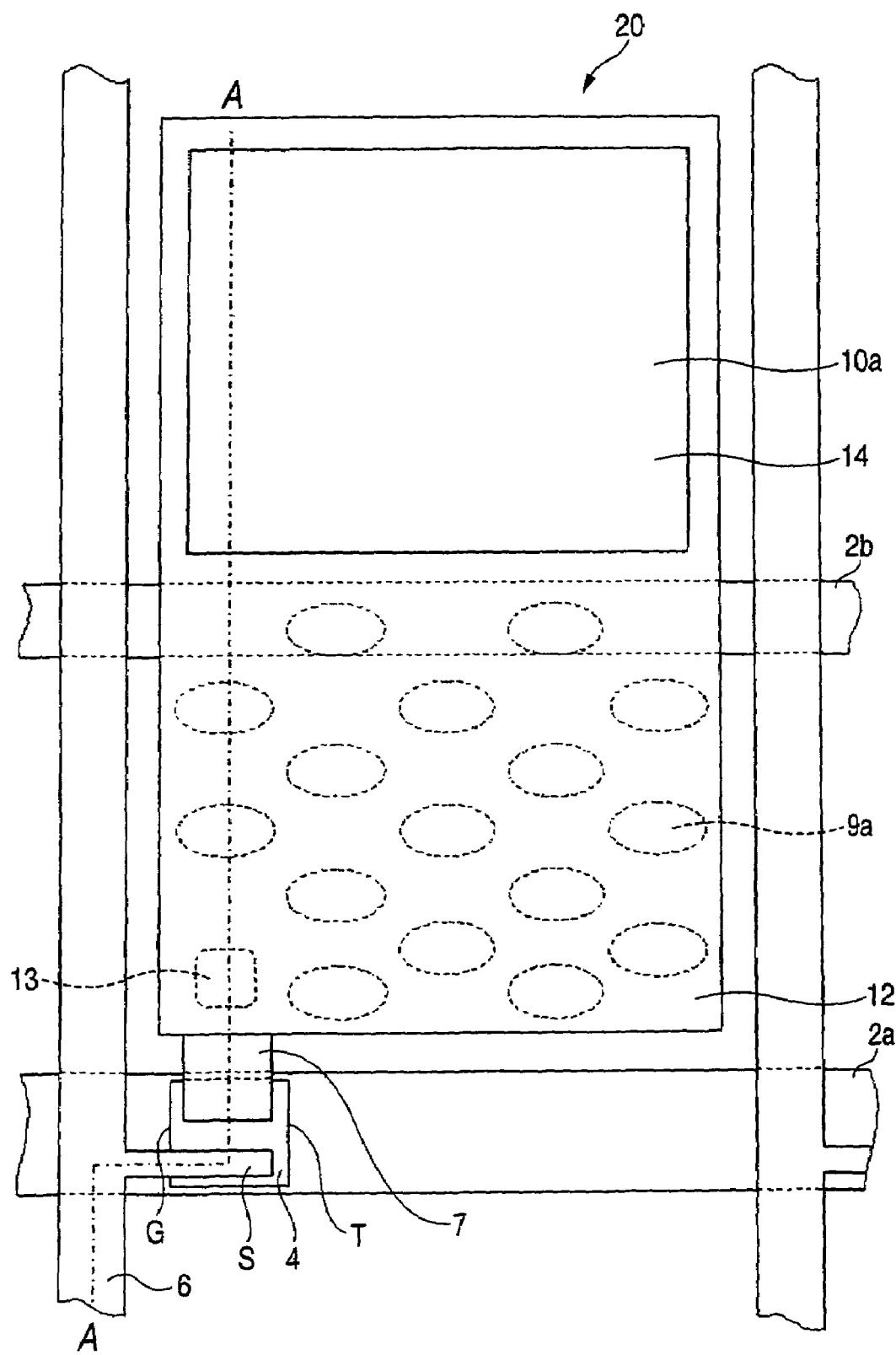
FIG. 1 is a plan view illustrating one pixel part of a semi-transmissive type liquid crystal display apparatus that is a first embodiment of the invention.
Figure 2:
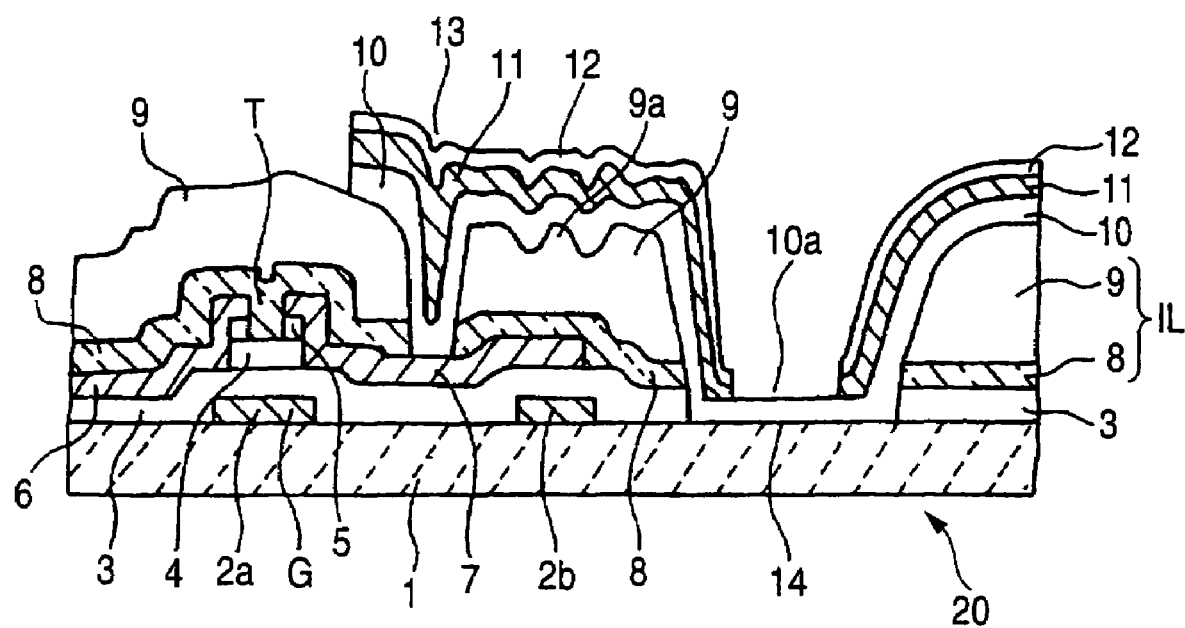
FIG. 2 is a cross-sectional view illustrating a cross-section of a part of the semi-transmissive type liquid crystal display apparatus that is the first embodiment of the invention.

Hereinafter, a first embodiment, which is a best mode for carrying out the invention, is described. FIG. 1 is a plan view illustrating one pixel part of a semi-transmissive type liquid crystal display apparatus that is the first embodiment of the invention. FIG. 2 is a cross-sectional view taken along line A-A shown in FIG. 1 and illustrates the configuration of a cross-section of a part of the semi-transmissive type liquid crystal display apparatus shown in FIG. 1. In these figures, like or corresponding portions are designated by like reference numerals. As shown in FIGS. 1 and 2, the semi-transmissive type liquid crystal display apparatus is configured so that each pixel part provided on a TFT array substrate 20 has a transparent pixel electrode 10a adapted to transmit light, and a reflective pixel electrode 11 adapted to reflect light. A counter electrode substrate (not shown) having a transparent common electrode is disposed to be opposed to this TFT array substrate 20. A liquid crystal material is interposed therebetween. Hereunder, the configuration of the TFT array substrate 20 is described with reference to FIGS. 1 and 2.

A plurality of gate wirings 2a including a gate electrode G, and an auxiliary capacity electrode and an auxiliary capacity wirings 2b are formed on a glass substrate 1 that is an insulating substrate. A gate insulating film 3 serving as a first insulating film is formed on an area other than a pixel opening 14 to cover such constituents. A semiconductor layer 4, which is constituted by a semiconductor active film formed above the gate electrode G through the gate insulating film 3, and an ohmic contact layer 5 are formed on the gate insulating film 3.

Also, a plurality of source wirings 6 including a source electrode S constituted by a second metal film, and a drain electrode 7 are formed on the gate insulating film 3. Incidentally, the source wirings 6 are formed to intersect with the gate wirings 2a through the gate insulating film 3, the semiconductor layer 4, and the ohmic contact layer 5. The drain electrode 7 is formed on the semiconductor layer 4, which is provided above the gate electrode G, to be opposed to and spaced from the source electrode S. A thin film transistor T serving as a switching element is formed corresponding to each pixel part and is constituted by the gate electrode G, the semiconductor layer 4, the source electrode S, and the drain electrode 7.

Further, an interlayer insulating film IL including a passivation film 8, which serves as a second insulating film, and an organic film 9 having an uneven surface, which includes a concave portion 9a, is formed on the thin film transistor T and above the gate wiring 2a and the source wiring 6. The interlayer insulating film IL has a contact hole 13, which is opened above the drain electrode 7, and a pixel opening 14 whose peripheral edge is tapered.

Furthermore, on the interlayer insulating film IL, a first transparent conductive film 10, a reflective pixel electrode 11 that serves as a third metal film, and a second transparent conductive film 12 are sequentially stacked in this order. The first transparent conductive film 10 is connected to the drain electrode 7 through the contact hole 13, and is brought into contact with a surface of the glass substrate 1 through the pixel opening 14 as a transparent pixel electrode 10a.

The reflective pixel electrode 11 and the second transparent conductive film 12 are stacked on the first transparent conductive film 10 to have a same pattern shape. The reflective pixel electrode 11 is made of an Al-alloy, which is a material having a high reflectance in the wavelength range of visible light, and has a thickness ranging from 50 nm to 200 nm. The thickness of the second transparent conductive film 12 is equal to or more than 5 nm or is equal to or less than 15 nm. The thickness of the second transparent conductive film 12 is equal to or more than 5 nm and sufficiently favorably covers the reflective pixel electrode 11. Thus, even in a case where processing using alkaline developer is performed during the patterning of the second transparent conductive film 12, a cell corrosion reaction can be suppressed. Also, because the thickness of the second transparent conductive film 12 is equal to or less than 15 nm, the reflectance of the reflective pixel electrode 11 is not degraded. Thus, this embodiment has an advantage in contributing to a favorable display.

Further, the reflective pixel electrode 11 and the second transparent conductive film 12 are connected to the drain electrode 7 through the contact hole 13 and the first transparent conductive film 10, and cover the tapered peripheral portion of the pixel opening 14. However, the electrode 11 and the film 12 are not formed in the pixel opening 14. Eventually, neither the metal film nor the insulating film is not formed in the pixel opening 14. Only the transparent pixel electrode 10a is formed therein. Thus, the transmissivity of back light is enhanced. Consequently, this embodiment has an advantage in obtaining bright displaying-light.

Additionally, the peripheral portion of the pixel opening 14 is tapered. Thus, the second transparent conductive film 12 can sufficiently favorably cover the reflective pixel electrode 11 even in the vicinity of the pixel opening 14. Consequently, a cell corrosion reaction, which is liable to occur when the substrate is immersed in the alkaline developer, can be suppressed.

Next, a process having a first step to a sixth step, which corresponds to a method of manufacturing the liquid crystal display apparatus that is the first embodiment, is described below. FIGS. 3A to 3F are cross-sectional views, each of which is taken along line A-A shown in FIG. 1 and illustrates a cross-section of one pixel part of the semi-transmissive type liquid crystal display apparatus shown in FIG. 1 in an associated one of six steps including the first step to the sixth step of the process. Hereinafter, the process is concretely described by referring to FIGS. 3A to 3F. Incidentally, in the case of the first embodiment, the process of manufacturing the TFT array substrate, which is a photolithography process having the six steps respectively using six mask patterns, is described below.

Figure 3A:
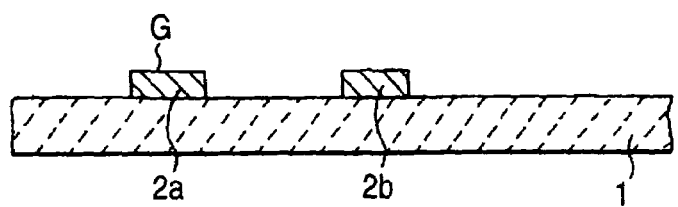
FIGS. 3A to 3F are cross-sectional views each illustrating a cross-section of a part of the semi-transmissive type liquid crystal display apparatus, which is the first embodiment of the invention, in an associated one of six steps including a first step to a sixth step of a process of manufacturing the semi-transmissive type liquid crystal display apparatus.

The first step of the process is described hereinbelow by referring to FIG. 3A. A first metal film is formed on the glass substrate 1, the surface of which is cleaned, by sputtering or the like. A single-layer or laminated thin film, which is made of a high melting-point metal, for example, chromium (Cr), molybdenum (Mo), or a Mo-alloy and has a thickness of about 200 nm to 300 nm, may be used as the first metal film. Film formation is performed under the following conditions. That is, a film formation temperature ranges from, for instance, 150° C. to 220° C. The flow rate of argon (Ar) gas is 100 sccm. An applied pressure ranges from 0.2 Pa to 0.4 Pa. A used DC power ranges from 10 kW to 15 kW.

Next, in the first step of the photolithography process, the patterning of the first metal film is performed, so that the gate electrode G, the gate wiring 2a, the auxiliary capacity electrode and the auxiliary capacity wiring 2b, the gate terminal portion (not shown), and so on are formed. In the photolithography process, after the substrate is cleaned, a photosensitive resist is applied thereto. Then, the resist is dried. Subsequently, light is passed through a mask pattern, in which a predetermined pattern is formed. Then, exposure and development are performed. Thus, a resist, to which the mask pattern is transferred, is formed on the substrate. Then, the photosensitive resist is heat-hardened. Thereafter, the first metal film is etched, so that the photosensitive resist is separated. Incidentally, wet etching is performed using an etchant, the liquid composition of which is a phosphoric acid+a nitric acid+an acetic acid+purified water, as the etching of the first metal film.

Figure 3B:
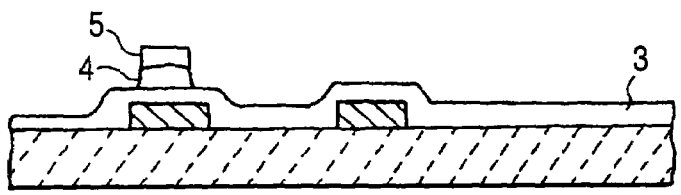

The second step of the process is described hereinbelow by referring to FIG. 3B. First, the gate insulating film 3 serving as the first insulating film, the semiconductor layer 4, and the ohmic contact layer 5 are sequentially formed by a plasma CVD method or the like. A silicon nitride (SiNx) film having a thickness ranging from 300 nm to 500 nm is used as the gate insulating film 3. An a-Si:H (amorphous silicon to which hydrogen atom is added) film having a thickness ranging from 100 nm to 200 nm is used as the semiconductor layer 4. An n-type a-Si (a-Si doped with a small amount of phosphorous (P)) film having a thickness ranging from 30 nm to 50 nm is used as the ohmic contact layer 5.

Subsequently, in the second step of the photolithography process, the semiconductor layer 4 and the ohmic contact layer 5 are patterned like an island to be left on at least a part on which the thin film transistor T is formed. Dry etching using, for instance, a mixed gas of $SF_6$ and $O_2$ or $CF_4$ and $O_2$ is performed as the etching performed on the semiconductor layer 4 and the ohmic contact layer 5.

Figure 3C:
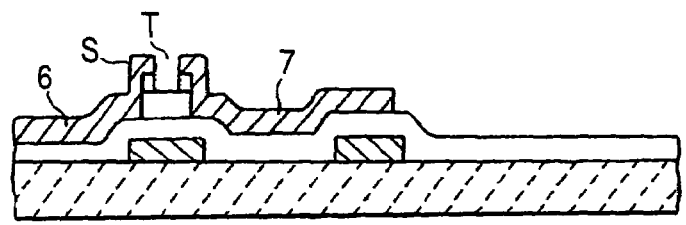

The third step of the process is described hereinbelow by referring to FIG. 3C. First, the second metal film is formed by sputtering or the like. A single-layer or laminated thin film, which is made of a high melting-point metal, for example, chromium (Cr), molybdenum (Mo), or a Mo-alloy and has a thickness of about 200 nm to 300 nm, may be used as the first metal film. Film formation is performed under the following conditions. That is, a film formation temperature ranges from, for instance, 150° C. to 220° C. The flow rate of argon (Ar) gas is 100 sccm. An applied pressure ranges from 0.2 Pa to 0.4 Pa. A used DC power ranges from 10 kW to 15 kW. Subsequently, in the third step of the photolithography process, the patterning of the second metal film is performed, so that the source electrode S, the source wiring 6, the drain electrode 7, and a source terminal part (not shown) are formed. Then, the ohmic contact layer 5 is etched by using the formed source electrode 6 and the formed drain electrode 7 as a mask. Thus, a central portion of the ohmic contact layer 5 of the thin film transistor T is removed so that the semiconductor layer 4 is exposed. Dry etching using, for instance, a mixed gas of $SF_6$ and $O_2$ or $CF_4$ and $O_2$ is performed as the etching performed on the ohmic contact layer 5.

The fourth step of the process is described hereinbelow by referring to FIG. 3D. First, the passivation film 8 serving as the second insulating film is formed by the plasma CVD method or the like. Also, the organic film 9 is formed on the passivation film 8 to thereby form the interlayer insulating film IL. For example, a SiNx film having a thickness of 100 nm may be used as the passivation film. Further, a known photosensitive organic resin film, which is formed to have a thickness ranging from 3.2 µm to 3.9 µm, is used as the organic film 9.

Subsequently, in the fourth step of the process, the organic film 9, the passivation film 8, and the gate insulating film 3 are patterned. In this step, the uneven surface including the concave portion 9a is formed on a part corresponding to a reflecting part of the organic film 9. Further, the contact hole 13 is formed above the drain electrode 7. Also, the pixel opening 14 is formed. Incidentally, contact holes are formed above a gate terminal part (not shown) and a source terminal part (not shown), respectively. Each of the contact holes is formed by dry etching using the organic film 9 as a mask to thereby remove the passivation film 8. An uneven surface including a concave portion 9a is provided on the surface of the organic film 9, which corresponds to the reflecting portion. Thus, incident outside light is scattered, so that favorable characteristics can be obtained.

Incidentally, in this step, two kinds of masks may be used for exposure of the organic film 9. However, one kind of a mask, in which both of a contact hole pattern and a concave part halftone pattern are formed together, may be used. Preferably, the concave part halftone pattern is adapted so that an amount of exposure light transmitted by this pattern is set to range from 20% to 80% of an amount of exposure light transmitted by the contact hole pattern. Both of the uneven surface, which includes the concave portion 9a, and the contact hole 13 are simultaneously formed in the organic film 9 by using such a halftone mask and by performing exposure one time.

Figure 3D:
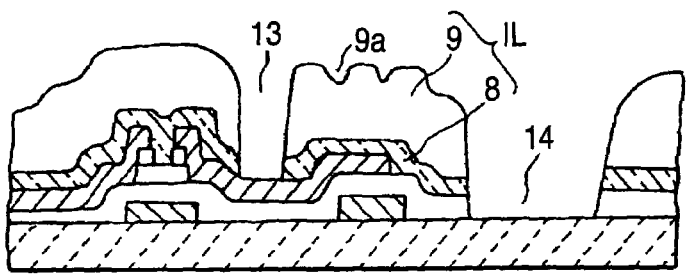

Incidentally, at that time, as illustrated in FIG. 3D, the organic film 9 and the passivation film 8 are removed and the drain electrode 7 is exposed from the pixel positioned between the thin film transistor T and the reflecting portion/ the contact hole 13 of a drain contact portion. Further, an etching time for opening the contact hole 13 is set so that the organic film 9, the passivation film 8, and the gate insulating film 3 are removed and the glass substrate 1 is exposed from the pixel opening 14. The cross-sections of the contact hole 13 and the pixel opening 14 are processed so that the coverage of the pixel electrode formed thereon is enhanced.

Figure 3E:
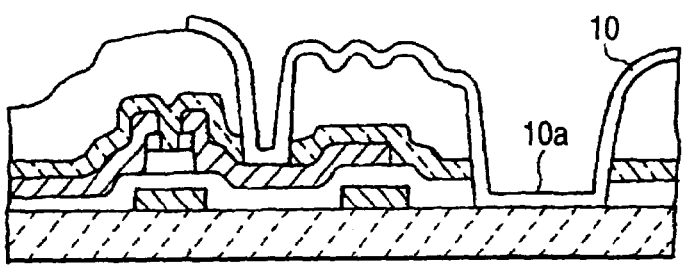

The fifth step of the process is described hereinbelow by referring to FIG. 3E. First, the first transparent conductive film 10 is formed by sputtering or the like. ITO, $SnO_2$, and IZO may be used as the material of the first transparent conductive film 10. Especially, it is preferable from the chemical stability view to use ITO. In the case of using an amorphous ITO as the first transparent conductive film 10, when the film is formed, or after the patterning, the film 10 is heated and is crystallized.

Subsequently, in the fifth step of the photolithography process, the patterning of the first transparent conductive film 10 is performed to thereby form the transparent pixel electrode 10a. Incidentally, the first transparent conductive film 10 is also formed on the uneven surface, which includes the concave portion 9a formed in the organic film 9, and the contact hole 13 formed therein. Known wet etching is used depending upon the used material as the etching performed on the first transparent conductive film 10. For example, in the case of using a crystallized ITO, the wet etching can be performed by using a water solution in which a hydrochloric acid and a nitric acid are mixed. Alternatively, in the case of using ITO, dry etching can be performed by using a gas having a known composition (for example, HI and Hbr).

Figure 3F:
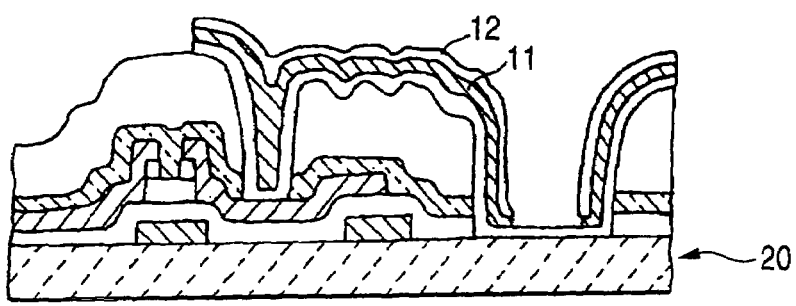

The sixth step of the process is described hereinbelow by referring to FIG. 3F. First, the third metal film is formed by sputtering. A single layer film made of an Al-alloy may be used as the third metal film. The third metal film is used as the reflective pixel electrode. Thus, it is preferable that the third metal film has a high reflectance in the wavelength range of visible light. In this case, the reflectance is seriously affected by the unevenness of the surface of the Al material used in the reflective pixel electrode. Also, this unevenness of the surface is largely affected by the thickness of the Al film. As the thickness of the Al film increases, the diffuse reflection component due to the increase of crystal grains increases. Especially, the diffuse reflection component abruptly increases when the thickness exceeds 200 nm. Thus, it becomes apparent that reflection light of the scattering angle component, which is most suitable for display, decreases. Furthermore, it is found that in a case where the thickness is less than 50 nm, an amount of light transmitted by the AL film increases, and an amount of reflection light contributing to the reflectance decreases. Therefore, it is desirable that the thickness of the Al film is equal to or more than 50 nm or is equal to or less than 200 nm. Subsequently, the second transparent conductive film 12 made of ITO, IZO or the like is formed to have a thickness ranging from 5 nm to 15 nm. Incidentally, an amorphous film is used as the second transparent conductive film 12.

Next, in the sixth step of the process, wet etching using an etchant, the liquid composition of which is a phosphoric acid+a nitric acid+an acetic acid+purified water, is performed after the patterning of the organic resist. At that time, the third metal film and the second transparent conductive film 12 are simultaneously etched by the liftoff action of etching of the reflective pixel electrode (the third metal film) 11. Thus, the reflective pixel electrode 11 is formed. That is, in this embodiment, the reflective pixel electrode 11 and the second transparent conductive film 12, which is provided above the reflective pixel electrode 11, are formed by using the same mask pattern. The formed pixel electrode 11 and the formed film 12 are collectively wet-etched by using the same etchant. Thus, the reflective pixel electrode (the third metal film) 11 and the second transparent conductive film 12 are patterned by using the same mask pattern, and are then collectively wet-etched by using the same etchant. Consequently, the second transparent conductive film 12 having the same pattern shape as that of the reflective pixel electrode 11 is formed to cover the entire reflective pixel electrode 11. Thus, the increase in the number of manufacturing steps and in the cost can be suppressed at the time of manufacturing the liquid crystal display apparatus adapted to have a small difference in work function between the reflective pixel electrode and the transparent common electrode of the counter electrode substrate, and to cause a defective indication, such as a flicker. Thus, the TFT array substrate 20 shown in FIGS. 1, 2, and 3F is completed by going through the aforementioned steps.

Incidentally, in a case where in the sixth step (FIG. 3F) of the process, an Al—Cu single-layer film having a thickness of 300 nm as the third metal film is formed, and where the second transparent conductive film 12 made of ITO is subsequently formed by changing the thickness from 2 nm to 10 nm, and is then immersed in the alkaline developer for a time ranging from 10 minutes to 20 minutes, the degree of corrosion of the reflection pixel electrode is investigated. Table 1 shows results of the investigation. Incidentally, in Table 1, a white circle "O" indicates that no pit-like corrosion traces are generated. A christcross "X" indicates that a pit-like corrosion trace is generated.

TABLE 1

| Thickness of Second Transparent Conductive Film (nm) | Time of Immersion in Developer (min.) | | |
|---|---|---|---|
| | 10 | 15 | 20 |
| 2 | X | | |
| 3 | X | | |
| 4 | X | | |
| 5 | O | O | O |
| 6 | O | O | O |
| 7 | O | O | O |
| 8 | O | O | O |
| 9 | O | O | O |
| 10 | O | O | O |

Results shown in Table 1 reveal that the generation of a pit-like corrosion trace, which is generated by the cell reaction at the development performed when the patterning of the reflective pixel electrode is performed, can be suppressed by forming the second transparent conductive film 12 to have a thickness of 5 nm or more. Meanwhile, in a case where the thickness of the second transparent conductive film 12 is too thick, the reflectance of the reflective pixel electrode 11 is degraded. Thus, it is desirable that the thickness of the second transparent conductive film 12 is set to be equal to or less than 15 nm. Therefore, the thickness of the second transparent conductive film 12 is set to range from 5 nm to 15 nm thereby to suppress the generation of cell corrosion and to form a liquid crystal display apparatus that has a favorable reflectance and also has good picture quality without causing a flicker.

In a subsequent cellization process, an oriented film is applied to the completed TFT array substrate 20. Then, a rubbing process is performed in a certain direction thereon. Similarly, an oriented film is applied to and a rubbing process is performed on the counter electrode substrate in which a black matrix, a color filter, a protective film for the color filter, and a common transparent pixel electrode are formed on the transparent insulating substrate. The TFT array substrate 20 and the counter electrode substrate are overlapped with each other through a spacer so that the oriented films applied to these substrates are opposed to each other. The peripheral portions of the substrates are bonded to each other by using a sealing agent. The liquid crystal material is sealed between both the substrates. Further, a backlight unit is attached to the back surface of the liquid crystal cell. Thus, the semi-transmissive type liquid crystal display apparatus according to the first embodiment is completed.

As described above, according to the first embodiment, the second transparent conductive film 12 is formed above the reflective pixel electrode 11 with good coverage. Thus, the alkaline developer can be prevented from going into the reflective pixel electrode 11. Also, the cell reaction between the alkaline developer and the pixel electrode, which serves as a foundation, is suppressed. Furthermore, the difference in work function between the reflective pixel electrode and the transparent common electrode of the counter electrode substrate can be reduced. Thus, the possibility of occurrence of a flicker and the burn-in of the liquid crystal material can be reduced. Further, the reflective pixel electrode (the third metal film) 11 and the second transparent conductive film 12 are patterned by using the same mask pattern, and are then collectively wet-etched by using the same etchant. Thus, the reflective pixel electrode 11 and the second transparent conductive film 12, which has the same pattern shape as that of the reflective pixel electrode 11, are formed. Consequently, the liquid crystal display apparatus, which does not causes flickers and the burn-in of the liquid crystal material, can be manufactured at low cost with high yield and without increasing the number of manufacturing steps.

Incidentally, although the semi-transmissive liquid crystal display apparatus has been described in the description of the first embodiment, the invention can be applied to a full-transmissive type liquid crystal display apparatus configured so that the reflective pixel electrodes are formed over the entire surface of the pixel display portion. Also, although the manufacturing method using a total of six masks in the six steps of the photolithography process, respectively, has been described, the manufacturing method according to the invention is not limited thereto.

What is claimed is:

1. A liquid crystal apparatus comprising:
   a TFT array substrate having an insulating substrate;
   a counter electrode substrate having a transparent common electrode; and
   a liquid crystal material sandwiched between the TFT array substrate and the counter electrode substrate,
   wherein the TFT array substrate includes on the insulating substrate:
   a plurality of gate wirings having a gate electrode;
   a plurality of source wirings having a source electrode and intersecting with the gate wirings;

a thin film transistor having the gate electrode, a semiconductor layer provided on the gate electrode through a gate insulating film, the source electrode, and a drain electrode;

an interlayer insulating film provided above the thin film transistor, the gate wirings, and the source wirings;

a transparent pixel electrode transmitting light, having a first transparent conductive film, which is provided on the interlayer insulating film, is electrically connected to the drain electrode through a contact hole provided in the interlayer insulating film disposed above the drain electrode, and is put into contact with a surface of the insulating substrate through a pixel opening provided in the gate insulating film and the interlayer insulating film;

a reflective pixel electrode reflecting light, made of an Al-alloy, which is electrically connected to the drain electrode in the contact hole through the first transparent conductive film; and a second transparent conductive film formed on the reflective electrode, the transparent pixel electrode and the reflective pixel electrode are provided in each single pixel part, and the second transparent conductive film has a same pattern shape as that of the reflective pixel electrode and has a thickness that is at least 5 nm.

2. The liquid crystal display apparatus according to claim 1, wherein the thickness of the second transparent conductive film is equal to or more than 5 nm and is equal to or less than 15 nm.

3. The liquid crystal display apparatus according to claim 1, wherein a thickness of the reflective pixel electrode is equal to or more than 50 nm and is equal to or less than 200 nm.

4. The liquid crystal display apparatus according to claim 2, wherein a thickness of the reflective pixel electrode is equal to or more than 50 nm and is equal to or less than 200 nm.

* * * * *